United States Patent
Bui

(10) Patent No.: US 7,551,924 B2
(45) Date of Patent: Jun. 23, 2009

(54) SYSTEM AND METHOD FOR USING A DUAL-MODE MOBILE STATION

(75) Inventor: Hung Viet Bui, Chantilly, VA (US)

(73) Assignee: Nextel Communications Inc., Reston, VA (US)

( * ) Notice: Subject to any disclaimer, the term of this patent is extended or adjusted under 35 U.S.C. 154(b) by 483 days.

(21) Appl. No.: 11/230,416

(22) Filed: Sep. 20, 2005

(65) Prior Publication Data
US 2006/0063561 A1 Mar. 23, 2006

Related U.S. Application Data

(60) Provisional application No. 60/610,979, filed on Sep. 20, 2004.

(51) Int. Cl.
H04W 4/00 (2009.01)
H04M 1/00 (2006.01)

(52) U.S. Cl. .................. 455/433; 455/553.1; 455/552.1

(58) Field of Classification Search ................ 455/433, 455/435.1, 435.2, 550.1, 552.1, 553.1; 370/318
See application file for complete search history.

(56) References Cited

U.S. PATENT DOCUMENTS

| 6,526,033 | B1 * | 2/2003 | Wang et al. .................. 370/338 |
| 6,889,049 | B2 * | 5/2005 | Khawand .................. 455/452.1 |
| 7,110,747 | B2 * | 9/2006 | Jain et al. .................... 455/411 |
| 7,349,695 | B2 * | 3/2008 | Oommen et al. ......... 455/432.1 |
| 2004/0072578 | A1 * | 4/2004 | Keutmann et al. ........ 455/456.1 |
| 2004/0162068 | A1 * | 8/2004 | Lamb et al. ............... 455/432.1 |
| 2004/0180664 | A1 * | 9/2004 | Numminen et al. ......... 455/445 |
| 2004/0229634 | A1 * | 11/2004 | Bushnell et al. ............. 455/461 |
| 2005/0064896 | A1 * | 3/2005 | Rautiola et al. .......... 455/553.1 |
| 2006/0019659 | A1 * | 1/2006 | Rosenberg et al. ....... 455/432.1 |
| 2006/0252427 | A1 * | 11/2006 | Bridges et al. ........... 455/435.2 |

* cited by examiner

Primary Examiner—Nay A Maung
Assistant Examiner—Andrew Wendell

(57) ABSTRACT

A system and method for operating a dual-mode mobile communications unit in a home network of the communications unit is disclosed. In an embodiment of the method, the dual-mode mobile communications unit is provisioned as a visitor in the home network of the communications unit. The home network utilizes a proprietary technology but the communications unit communicates with the home network in the same standards-based technology that a roamer in the home network uses to communicate with the home network. In an embodiment of the system, the system includes the home network of the communications unit, where the home network utilizes a proprietary technology but where the communications unit communicates in the home network in the standards-based technology. The system also includes a visitor location register coupled to the home network. The dual-mode mobile communications unit is provisioned as a visitor in the visitor location register of the home network.

18 Claims, 1 Drawing Sheet

SYSTEM AND METHOD FOR USING A DUAL-MODE MOBILE STATION

This application claims the benefit of U.S. Provisional Patent Application Ser. No. 60/610,979, filed Sep. 20, 2004, the disclosure of which is herein expressly incorporated by reference.

FIELD OF THE INVENTION

The present invention relates generally to the field of telecommunications, and in particular, to operating a dual-mode mobile communications device in a proprietary network.

BACKGROUND OF THE INVENTION

Currently, there are numerous different types of wireless communications networks and each of these networks may operate by utilizing a different communications technology. For example, while most European wireless networks operate using Global System for Mobile Communications (GSM) technology, many wireless communications networks in the United States operate using a different Time Division Multiple Access (TDMA) technology. Even within any particular country, different wireless communications providers may use different types of networks. For example, in the United States some wireless providers use GSM while others operate using a different TDMA technology or even Code Division Multiple Access (CDMA) technology.

Wireless communications networks which operate using these different technologies are generally incompatible. However, it may be desirable for a mobile communications device, e.g., a mobile phone, to be able to communicate in these different technologies, for example when roaming in a visited network.

Generally, any one cellular communications provider, particularly in the United States, does not have a network infrastructure that can provide service throughout the entire United States for its customers. Therefore, these cellular communications providers execute agreements with one or more other carriers to provide wireless services to each others' subscribers when the subscribers are out of their home network's coverage area but are in an area covered by one of these other carriers. Thus, these roaming agreements are commonly used where one carrier can not offer service in all of the areas where it's customers may require service. However, as discussed above, because these networks may utilize different communications technologies, mobile stations are increasingly designed with a "dual-mode" capability to allow them to communicate in different technologies. Thus, the mobile station communicates with it's home network using one mode, or technology, and with a visited network in a second mode, or technology, when roaming in that network. For example, the home network may use one TDMA technology and the visited network may use GSM technology. In this circumstance, the dual-mode mobile station communicates with it's home network in the TDMA mode and with the visited network in the GSM mode when roaming in the visited network.

Therefore, a dual-mode mobile phone is able to communicate in two technologies. In a particular circumstance, the dual-mode phone may have one mode which uses a standards-based technology and a second mode which uses a proprietary technology. In this circumstance, the standards-based technology may be the technology used when roaming in a visited network and the proprietary technology may be the technology used in the phone's home network. Since there are advantages to using standards-based technology, it may be desirable for the mobile phone to use the standards-based technology even when the phone is communicating in its home network.

Therefore, it would be desirable to take advantage of this standards-based technology with a dual-mode mobile phone even in the situation where the phone is communicating in its home network which uses a proprietary technology.

SUMMARY OF THE INVENTION

A method for operating a dual-mode mobile communications unit in a home network of the communications unit is provided. In an embodiment, the method includes provisioning the dual-mode mobile communications unit as a visitor in the home network of the communications unit. The home network utilizes a proprietary technology but the communications unit communicates with the home network in the same standards-based technology that a roamer in the home network uses to communicate with the home network.

Additionally, a system for operating the dual-mode mobile communications unit in the home network of the communications unit is provided. In an embodiment, the system includes the home network of the dual-mode mobile communications unit, where the home network utilizes a proprietary technology but where the communications unit communicates in the home network in a standards-based technology. The system also includes a visitor location register coupled to the home network, where the dual-mode mobile communications unit is provisioned as a visitor in the visitor location register of the home network.

DETAILED DESCRIPTION OF THE EXEMPLARY EMBODIMENTS

Figure 1:
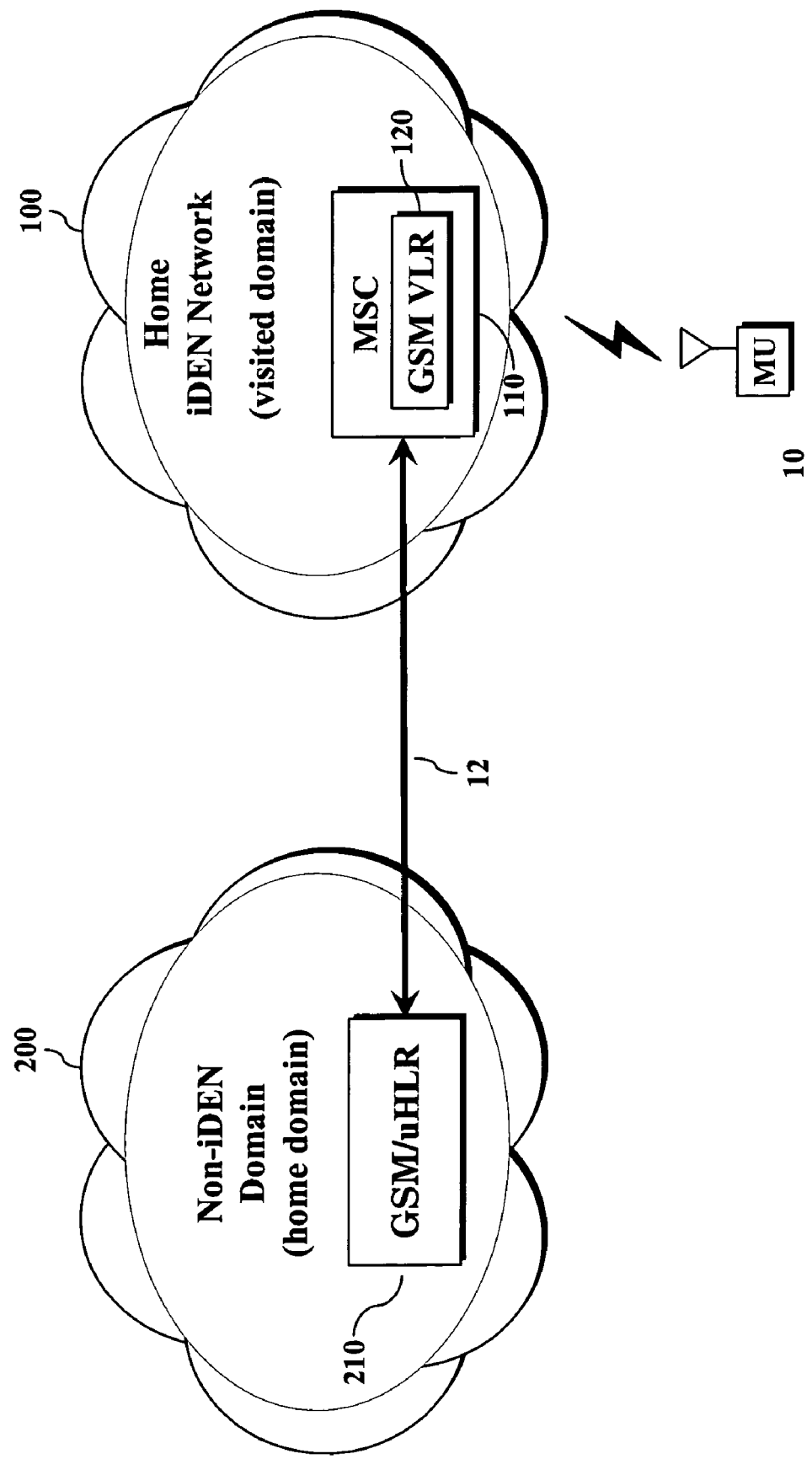
FIG. 1 illustrates an embodiment of an architecture for provisioning a dual-mode mobile communications unit as a visitor in the unit's home network in accordance with the principles of the present invention.

FIG. 1 illustrates an embodiment for an architecture for utilizing a dual-mode mobile phone in its home network in accordance with the principles of the present invention.

In this embodiment, a subscriber of home network 100 with a mobile communications unit 10 is communicating in her home network. Home network 100 uses a proprietary technology such as, for example, the Integrated Digital Enhanced Network (iDEN) technology as utilized by Motorola in the Nextel communications network. Thus, in an embodiment, it may be referred to as an iDEN domain and mobile communications unit 10 is able to communicate with home network 100 in an iDEN mode. As is known, unit 10 communicates with the home network in this technology when in the coverage area of the home network. However, mobile communications unit 10 also has a second mode of operation which allows it to operate with a different technology, such as for example, when roaming in a visited network that uses this different technology. Dual-mode communication units are known and the mobile communications unit may be any of a variety of different types of devices that provide for voice communications, e.g., a wireless telephone.

In addition to the capability of home network 100 for using its proprietary technology, e.g., iDEN, to support its subscribers, the home network also includes the functionality to support a roaming visitor in the network who uses an open, published, standards-based technology. This functionality may be embodied with a visitor location register (VLR) 120 in mobile switching center (MSC) 110, which allows the roamer's communications device, which is not capable of using iDEN technology but which uses another standards-based technology, to communicate in network 100 by using this other standards-based technology. As is known, VLR 120 uses a standards-based interface 12 to interface the roamer's mobile phone to the functionality required for supporting this roamer in network 100. This functionality is represented in FIG. 1 by the Non-iDEN Technology Domain 200, i.e., the standards-based technology.

Thus, as is known, home network 100 is able to support a roamer in the network who uses a standards-based technology. The supported functionality provides all requirements necessary to allow the standards-based technology roamer to operate in network 100. For example, power requirements, network access, ability to make and receive calls, etc., are all supported for the roamer. This functionality is represented by Non-iDEN Domain 200, which functionally may include a universal Home Location Register (uHLR) 210, which may be based on the standards-based GSM technology. In the GSM context, this can be referred to as the proprietary network providing standard GSM roaming service.

Thus, it is known how to support a roamer who uses a standards-based technology in a network which uses a proprietary technology, e.g., iDEN. The present invention utilizes this same capability of the proprietary network to support a standards-based technology roamer to also support a home network subscriber who has a dual-mode phone that is also capable of communicating in this standards-based technology. Thus, in the present invention, the home network subscriber always communicates with home network 100 by using the standards-based technology mode of the dual-mode phone, as opposed to using the proprietary technology, and associated phone mode, of the subscriber's home network. Therefore, in the subscriber's home network, the subscriber is treated as a "visitor" or roamer and the subscriber communicates with the home network in the standards-based technology. The home network, e.g., the iDEN network, is provisioned as the "visited" network or domain for the dual-mode phone. In the GSM context, this can be referred to as the dual-mode mobile phone being provisioned to operate in the standard GSM inbound roaming mode.

In this circumstance, when a subscriber of network 100 is treated as a roamer, and thus is communicating with the network in the alternate mode of the standards-based technology, the MSC 110 and VLR 120 of the iDEN network performs the same functions for the "roaming" subscriber as was described above for an actual roamer. Thus, the iDEN MSC acts as a standard GSM VLR to provide mobile interconnect voice service, e.g., cellular telephone service, for the "roaming" subscriber. The present invention takes advantage of using standards-based technology, through use of the standards-based technology mode of the dual-mode phone, even in the circumstance where a subscriber's home network uses a proprietary technology. For example, in an embodiment, the present invention provisions the home network subscriber as a GSM "visitor" in the iDEN home network. Because the subscriber is recognized as a "GSM visitor", the same standards-based technology that is used to support an actual GSM visitor in the iDEN network is used to support the subscriber.

The use of standards-based technology for supporting a subscriber has advantages. As can be understood, there are drawbacks with using proprietary technology. Among other drawbacks, the proprietary technology may be difficult to support, may have technical limitations, and may require the service provider of communications network 100 to possibly be dependent upon a third party developer of the proprietary technology. Therefore, the present invention takes advantage of using a standards-based technology in a proprietary network.

The present invention is not limited to the home network utilizing the proprietary iDEN technology and the standards-based technology being limited to GSM technology. The present invention can be practiced in any of a variety of networks in the circumstance described above where a standards-based technology is available in a proprietary network. For example, the invention can be practiced with Wireless Fidelity (Wi-Fi) technology where the standard interface is a Wi-Fi interface and where the dual-mode communications unit communicates with the proprietary network in the Wi-Fi technology. As another example, the standards-based technology can be a Code Division Multiple Access (CDMA) technology, the standard interface is a CDMA interface, and the dual-mode communications unit is communicating in the CDMA technology.

The disclosed embodiments are illustrative of the various ways in which the present invention may be practiced. Other embodiments can be implemented by those skilled in the art without departing from the spirit and scope of the present invention.

What is claimed is:

1. A method for operating a dual-mode mobile communications unit of a home network in the home network of the communications unit, comprising the steps of:
provisioning the dual-mode mobile communications unit of the home network as a roaming visitor in the home network of the communications unit; and
communicating with the home network by the communications unit of the home network in a standards-based technology;
wherein the home network utilizes a proprietary technology to communicate with mobile communications units of the home network, wherein the proprietary technology, as contrasted with the standards-based technology, is not an open, published, standards based technology, and wherein the home network communicates with roaming visitors in the home network in the standards-based technology;
and wherein a mobile switching center (MSC) and a visitor location register (VLR) of the home network performs same functions for the dual-mode mobile communications unit of the home network that is provisioned as a roaming visitor in the home network as they perform for roaming visitors in the home network.

2. The method of claim 1 wherein the standards-based technology is a Global System for Mobile Communications (GSM) technology.

3. The method of claim 1 wherein the proprietary technology is an Integrated Digital Enhanced Network (iDEN) technology.

4. The method of claim 1 wherein the visitor location register is a GSM VLR.

5. The method of claim 1 wherein the standards-based technology is a Wireless Fidelity (Wi-Fi) technology.

6. The method of claim 1 wherein the standards-based technology is a CDMA technology.

7. A method for operating a dual-mode mobile communications unit in an Integrated Digital Enhanced Network (iDEN) network, wherein the iDEN network is a home network of the communications unit and wherein the dual-mode mobile communications unit includes a first mode associated with a proprietary iDEN technology and a second mode associated with a standards-based technology, comprising the steps of:

provisioning the dual-mode mobile communications unit of the home iDEN network as a roaming visitor in the home iDEN network; and communicating with the home iDEN network by the dual-mode mobile communications unit in the second mode associated with the standards-based technology;

wherein the home iDEN network utilizes the proprietary iDEN technology to communicate with mobile communications units of the home iDEN network, wherein the proprietary iDEN technology, as contrasted with the standards-based technology, is not an open, published, standards based technology, and wherein the home iDEN network communicates with roaming visitors in the home iDEN network in the standards-based technology;

and wherein a mobile switching center (MSC) and a visitor location resister (VLR) of the home iDEN network performs same functions for the dual-mode mobile communications unit of the home iDEN network that is provisioned as a roaming visitor in the home iDEN network as they perform for roaming visitors in the home iDEN network.

8. The method of claim 7 further comprising the step of communicating with a standards-based network by the dual-mode mobile communications unit in the second mode associated with the standards-based technology as a visitor in the standards-based network.

9. The method of claim 7 wherein the standards-based technology is a Global System for Mobile Communications (GSM) technology.

10. The method of claim 7 wherein the visitor location register is a Global System for Mobile Communications (GSM) VLR.

11. The method of claim 7 wherein the standards-based technology is a Wireless Fidelity (Wi-Fi) technology.

12. The method of claim 7 wherein the standards-based technology is a CDMA technology.

13. A system for operating a dual-mode mobile communications unit in a home network of the communications unit, comprising:

a home network of the dual-mode mobile communications unit, wherein the home network utilizes a proprietary technology to communicate with mobile communications units of the home network, wherein the proprietary technology. as contrasted with a standards-based technology, is not an open, published, standards based technology, and wherein the home network communicates with roaming visitors in the home network in the standards-based technology, and wherein the dual-mode mobile communications unit communicates in the home network in the standards-based technology; and a mobile switching center (MSC) and a visitor location register (VLR) coupled to the home network, wherein the dual-mode mobile communications unit is provisioned as a roaming visitor in the VLR of the home network, and wherein the MSC and the VLR of the home network performs same functions for the dual-mode mobile communications unit of the home network that is provisioned as a roaming visitor in the home network as they perform for roaming visitors in the home network.

14. The system of claim 13 wherein the dual-mode mobile communications unit is a cellular telephone.

15. The system of claim 13 wherein the standards-based technology is a Global System for Mobile Communications (GSM) technology.

16. The system of claim 13 wherein the proprietary technology is an Integrated Digital Enhanced Network (iDEN) technology.

17. The system of claim 13 wherein the standards-based technology is a Wireless Fidelity (Wi-Fi) technology.

18. The system of claim 13 wherein the standards-based technology is a CDMA technology.

* * * * *